UNITED STATES PATENT OFFICE.

FRANCIS GUILLIOUMA, OF NEW BALTIMORE, OHIO.

LINIMENT.

SPECIFICATION forming part of Letters Patent No. 284,629, dated September 11, 1883.

Application filed April 23, 1883. (No specimens.)

*To all whom it may concern:*

Be it known that I, FRANCIS GUILLIOUMA, a citizen of the United States, residing at New Baltimore, in the county of Stark and State of Ohio, have invented a new and useful composition of matter to be used in the treatment of inflammatory rheumatism and like diseases, of which the following is a specification.

My composition consists of the following ingredients, combined in the proportions stated, viz: alcohol, one pint; pure cider vinegar, one-fourth pint; kerosene-oil, one-fourth pint; spirits of turpentine, two ounces; ground cayenne-pepper, two ounces; ground French mustard, two ounces; flowers of sulphur, two ounces; ground ginger, two ounces; carbolic acid, two ounces. These ingredients are to be mixed cold and to be thoroughly mingled by agitation and stand twenty-four hours, when it is ready for use. In use the said composition is applied externally to the part of the person affected, which is done by pouring a small quantity of said composition in the hand or on a piece of flannel, and then rubbing the part or parts affected. This operation may be repeated every few hours.

What I claim, and desire to secure by Letters Patent of the United States, is—

A composition for medical purposes, composed of alcohol, pure cider vinegar, kerosene-oil, spirits of turpentine, ground cayenne-pepper, ground French mustard, flowers of sulphur, ground ginger, and carbolic acid in about the proportions specified.

In testimony that I claim the above I have hereunto subscribed my name in presence of two witnesses.

FRANCIS GUILLIOUMA.

Witnesses:
FRED. W. BOND,
J. W. BARNABY.